(12) United States Patent
Tschernutter et al.

(10) Patent No.: US 8,595,756 B2
(45) Date of Patent: Nov. 26, 2013

(54) SYSTEM AND METHOD FOR SELLING OR LICENSING IMAGE FILES

(75) Inventors: Frederick Tschernutter, Merate (IT); Olivier Boucard, Mougins (FR)

(73) Assignee: Voxlibertum S.A., Bioggio (CH)

( * ) Notice: Subject to any disclaimer, the term of this patent is extended or adjusted under 35 U.S.C. 154(b) by 92 days.

(21) Appl. No.: 13/183,993

(22) Filed: Jul. 15, 2011

(65) Prior Publication Data
US 2013/0019257 A1 Jan. 17, 2013

(51) Int. Cl.
*H04N 7/16* (2011.01)
*G06Q 30/00* (2012.01)

(52) U.S. Cl.
USPC .......................... 725/4; 705/14.72; 705/14.53

(58) Field of Classification Search
USPC ................ 705/14.72, 14.53, 14.61; 725/93, 4
See application file for complete search history.

(56) References Cited

U.S. PATENT DOCUMENTS

| | | | |
|---|---|---|---|
| 6,690,488 B1 * | 2/2004 | Reuman | 358/1.9 |
| 8,174,560 B2 | 5/2012 | Jannard et al. | |
| 8,358,357 B2 | 1/2013 | Jannard et al. | |
| 2006/0066510 A1 * | 3/2006 | Takahashi | 345/9 |
| 2009/0222866 A1 * | 9/2009 | Jenzowsky et al. | 725/93 |
| 2009/0303550 A1 * | 12/2009 | Hirabayashi | 358/448 |
| 2009/0328117 A1 * | 12/2009 | Morris et al. | 725/105 |
| 2010/0161375 A1 * | 6/2010 | Lloyd et al. | 705/10 |
| 2011/0035255 A1 * | 2/2011 | Dasher et al. | 705/10 |
| 2011/0099579 A1 * | 4/2011 | Kim et al. | 725/44 |
| 2011/0166968 A1 * | 7/2011 | Houng et al. | 705/30 |

OTHER PUBLICATIONS

Redcine-X® Pro "Operation Guide," Red Digital Cinema, ©2012 Red.Com, Inc., www.red.com, Jul. 2012.
Redcine-X™ "Operation Guide," Red Digital Cinema, ©2009-2010 Red.Com, Inc., www.red.com, Dec. 17, 2010.
Final Cut Studio, Final Cut Pro 7. Expanded ProRes Family, http://www.apple.com/finalcutstudio/finalcutpro/apple-prores.html, Printed May 20, 2011.

* cited by examiner

*Primary Examiner* — Pankaj Kumar
*Assistant Examiner* — Tariq Gbond
(74) *Attorney, Agent, or Firm* — Baker Botts L.L.P.

(57) ABSTRACT

According to one embodiment, a method for selling or licensing digital video clips includes receiving a first catalog image file representing first digital video in a raw image format and receiving a second catalog image file representing second digital video in a raw image format. The method further includes receiving a selection of the first catalog image file, a selection of one or more first parameters, and payment information for a purchase or a license of a first image file that is a version of the first catalog image file. At least one of the first parameters specifies a second format, and the first image file has the second format. The method further includes generating the first image file, where generating the first image file includes processing the first catalog image file based on the first parameters. The method further includes transmitting the first image file.

12 Claims, 5 Drawing Sheets

FIG. 1B

SYSTEM AND METHOD FOR SELLING OR LICENSING IMAGE FILES

TECHNICAL FIELD

This disclosure relates generally to the field of image creation and more specifically a system and method for selling or licensing image files.

BACKGROUND

Digital cameras typically provide the ability to generate digital images that may be transmitted over the Internet to various computer systems. Unfortunately, many digital images have file standards that are incompatible with various technological platforms, operating systems, and machinery. Furthermore, even when a digital image may be trans-coded to other file standards for use with these other systems, the storage requirements associated with providing a selection of each the various file standards is impractical.

SUMMARY OF THE DISCLOSURE

According to one embodiment, a method for selling or licensing digital video clips includes receiving a first catalog image file representing first digital video in a raw image format and receiving a second catalog image file representing second digital video in a raw image format. The method further includes receiving a selection of the first catalog image file, a selection of one or more first parameters, and payment information for a purchase or a license of a first image file that is a version of the first catalog image file. At least one of the first parameters specifies a second format, and the first image file has the second format. The method further includes generating the first image file, where generating the first image file includes processing the first catalog image file based on the first parameters. The method further includes transmitting the first image file.

Certain embodiments of the disclosure may provide one or more technical advantages. For example, generating an image file may allow a computer system to provide any particular image file to a user without requiring a large storage capacity. In such an example, the particular image file may be generated "on the fly," as opposed to storing every image file at the computer system, thereby reducing the storage needs.

As a further example, generating, by a first computer system, an image file may allow the image file to be generated without any special software being installed on a user's computer system. As another example, generating image files using a selection of parameters may allow a user to request any particular image file, thereby allowing the user to create their own version of a catalog image file.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

A more complete understanding of embodiments of the disclosure will be apparent from the detailed description taken in conjunction with the accompanying drawings in which:

FIGS. 1A-1C illustrate example screenshots of a user interface that allows a user to purchase or license various digital image clips having a desired format according to a particular embodiment;

DETAILED DESCRIPTION OF EXAMPLE EMBODIMENTS

Embodiments of the present disclosure are best understood by referring to FIGS. 1 through 4 of the drawings, like numerals being used for like and corresponding parts of the various drawings.

It should be understood at the outset that although example implementations of embodiments of the disclosure are illustrated below, the present disclosure may be implemented using any number of techniques, whether currently known or not. The disclosure should in no way be limited to the example implementations, drawings, and techniques illustrated below. Additionally, the drawings are not necessarily drawn to scale.

Figure 1A:

FIG. 1A illustrates an example screenshot of a user interface 10 that allows a user to purchase or license various digital image clips having a desired format according to a particular embodiment. In particular embodiments, purchasing or licensing digital image clips having a desired format may refer to purchasing or licensing the right to use digital image clips having a desired format. According to the illustrated embodiment, user interface 10 includes digital video clips 14 (14a, 14b, 14c, 14d, and 14e) and search window 18.

Digital video clips 14 represent digital video clips that may be purchased or licensed by a user. For example, a user may select a particular digital video clip 14, and may indicate a particular format that the user desires digital video clip 14 to have. As such, a copy of the digital video clip 14 having the particular format may be transmitted (or accessible) to a user. In particular embodiments, each digital video clip 14 may be displayed to a user as a preview. In particular embodiments, a preview may be all or a part of the content of the digital video clip 14. For example, if the digital video clip 14 is a five-minute digital video file, the preview may be only a portion of this, such as a processed three-second preview of digital video clip 14. As such, the preview may provide an example of the content of digital video clip 14. The preview of digital video clip 14 may include preview 134 discussed in FIG. 2.

Each of the digital video clips 14 displayed to a user may have different content. For example, digital video clip 14a may be a video of a person playing tennis, digital video clip 14b may be a video of a person playing basketball, digital video clip 14c may be a video of the ocean, digital video 14d may be a video clip of a waterfall, and digital video clip 14e may be a video of a sleeping dog. The content of digital video clips 14 illustrated in FIG. 1A is merely an example. Digital video clips 14 may have any other content. Furthermore, although FIG. 1A illustrates five different digital video clips 14, in particular embodiments, any other number of digital video clips 14 may be displayed to a user. For example, less than five digital video clips 14 may be displayed to a user, or more than five digital video clips 14 may be displayed to a user, such as 50 digital video clips 14, 100 digital video clips 14, or any other number.

Video search window 18 provides a user with the ability to search for particular digital video clips 14. For example, a user may request a digital video clip 14 of a person playing tennis. In such an embodiment, the user may input "tennis" in the video search window 18, and one or more digital video clips 14 that correspond to the keyword "tennis" may be displayed. According to the illustrated embodiment, video search window 18 further allows a user to refine a search for digital video clips 14. For example, a user may select one or more concepts for the digital video clips 14 (such as objects, activities, art, night shot, etc.), original screen format, original frame rate, original resolution, the type of device the digital video clip 14 was shot on, framing (such as extreme wide, wide shot, close-up, etc.), orientation (such as landscape, portrait, etc.), or any other search factors. In particular embodiments, by selecting one or more of these search factors in video search window 18, a user may be able to refine their search for digital video clips 14 that they may desire to purchase or license.

Figure 1B:
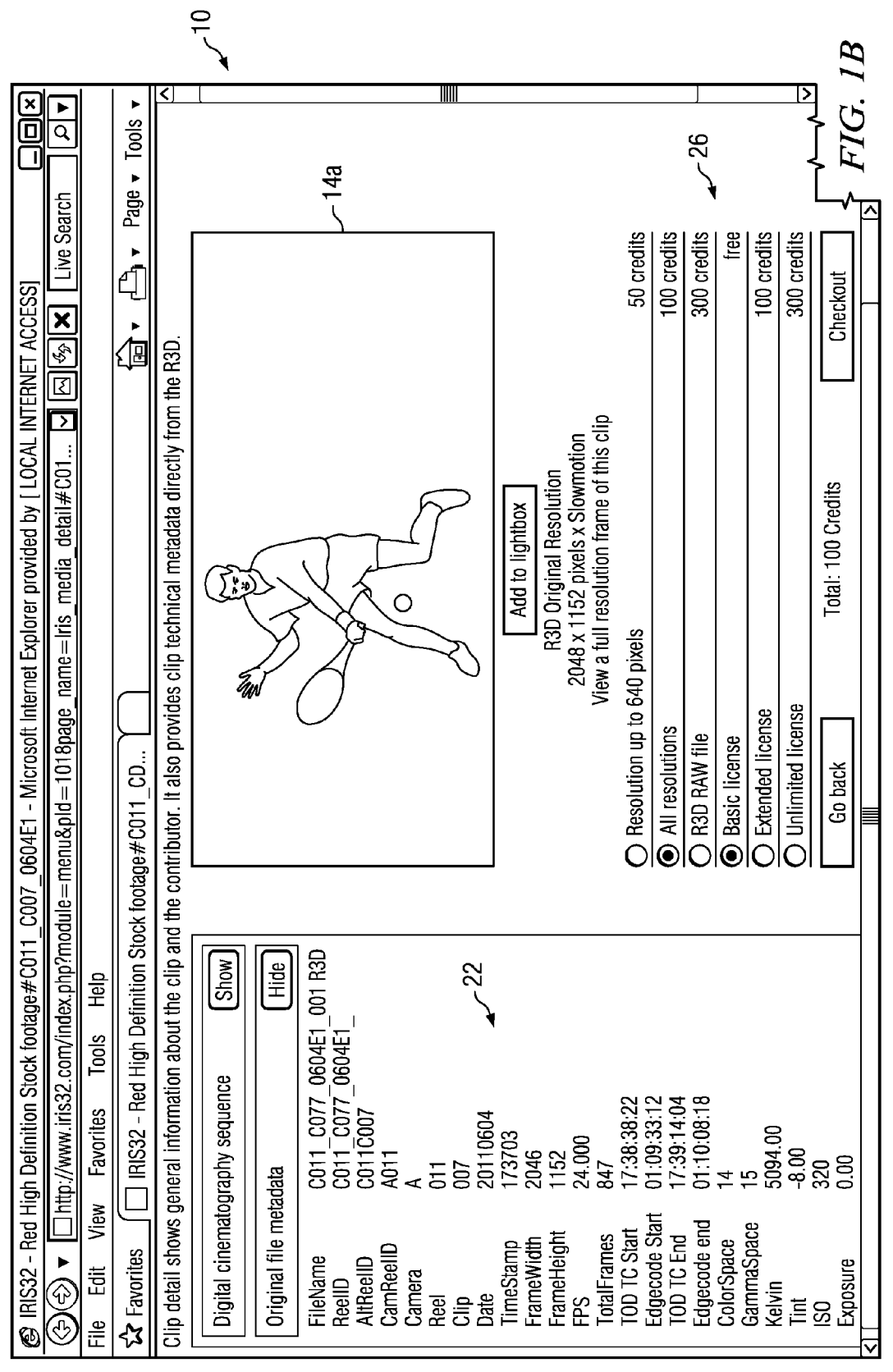

FIG. 1B illustrates an example screenshot of a user interface 10 that allows a user to purchase or license various digital image clips having a desired format according to a particular embodiment. According to the illustrated embodiment, user interface 10 includes digital video clip 14a, video information 22, and purchase/license option selection window 26. As is illustrated, digital video clip 14a of FIG. 1B may be substantially similar to digital video clip 14a of FIG. 1A.

Video information 22 may include any information about digital video clip 14a. For example, video information 22 may present metadata extracted from digital video clip 14a in text format. As such, a user may be able to view information about a digital video clip 14a prior to deciding to purchase or license digital video clip 14a. In particular embodiments, video information 22 may include data 138 discussed in FIG. 2.

Purchase/license option selection window 26 allows a user to select various purchase and license options for digital video clip 14a. For example, purchase/license option selection window 26 may allow a user to select a particular type of license or a particular type of purchase agreement for digital video clip 14a.

Figure 1C:
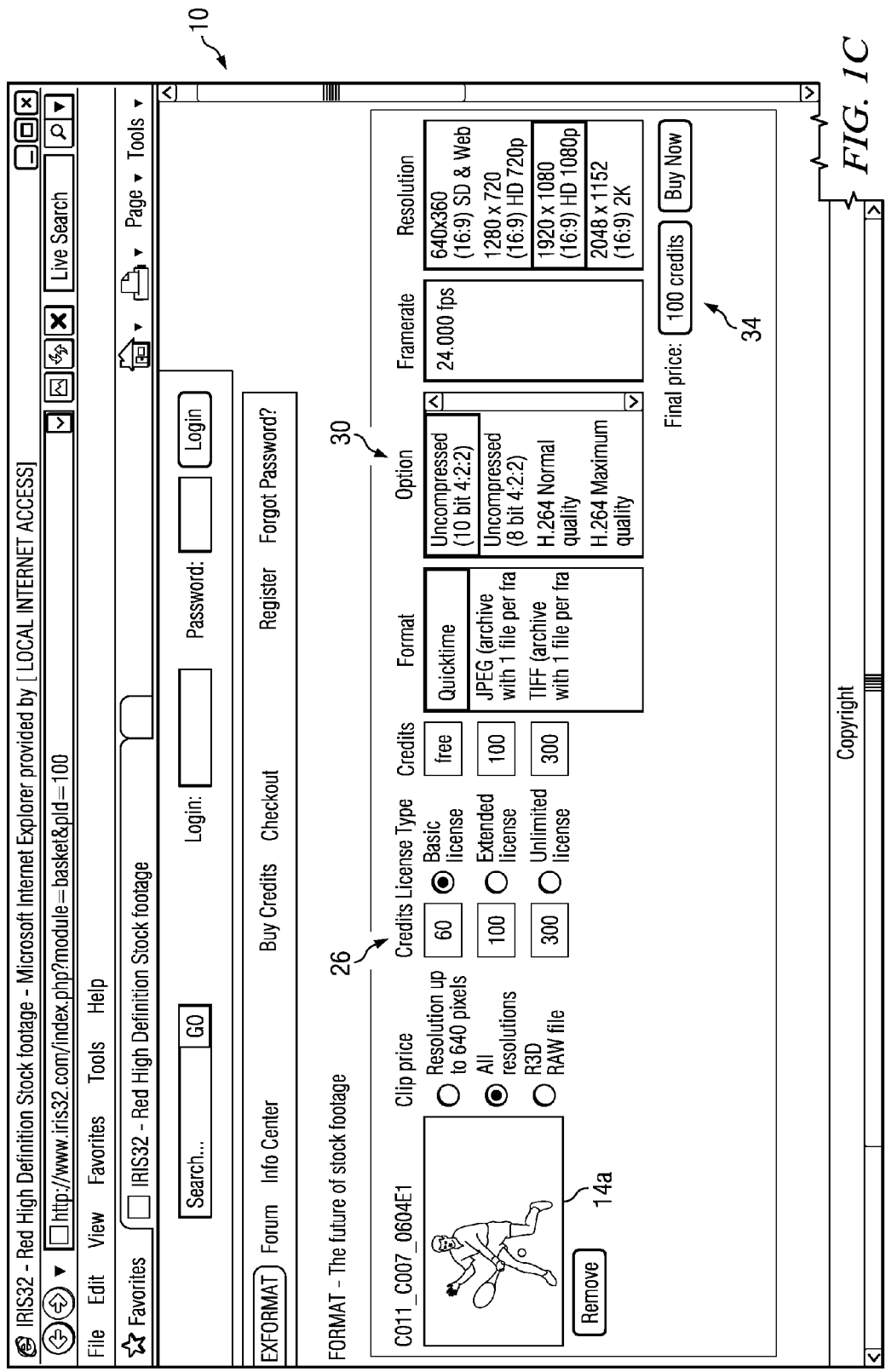

FIG. 1C illustrates an example screenshot of a user interface 10 that allows a user to purchase or license various digital image clips having a desired format. According to the illustrated embodiment, user interface 10 includes digital video clip 14a, purchase/license option selection window 26, parameter selection window 30, and purchase/license selection window 34. As is illustrated, digital video clip 14a of FIG. 1C may be substantially similar to digital video clip 14a of FIGS. 1A and 1B, and purchase/license option selection window 26 of FIG. 1C may be substantially similar to purchase/license option selection window of FIG. 1B.

Parameter selection window 30 allows a user to select various parameters for digital video clip 14a. The parameters listed in parameter selection window 30 may include any parameters that may be used in order to generate digital video clip 14a as desired by a user. For example, parameter selection window 30 may allow a user to select a particular format, option(s), frame rate, resolution, any other parameter, or any combination of the preceding for digital video clip 14a. Based on these selections, digital video clip 14a may be generated to have such parameters, as is discussed in FIG. 2. Accordingly, a user may be able to purchase or license a digital video clip 14a that includes any of the parameters selected by the user. In particular embodiments, the parameters listed in parameter selection window 30 may include parameters 142 discussed in detail in FIG. 2.

Purchase/license selection window 34 may allow a user to purchase/license digital video clip 14a. For example, once a user has selected digital video clip 14a, and further selected the parameters for digital video clip 14a, the user may click on a button in order to purchase or license the digital video clip 14a. In particular embodiments, by selecting to purchase/license digital video clip 14a, various purchasing information may be provided in order to conduct the purchase/license.

As is discussed above, FIGS. 1A-1C illustrate example screenshots of a user interface that allows a user to purchase or license various digital image clips having a desired format according to a particular embodiment. In particular embodiments, this user interface may present a user with various digital video clip options, allow the user to select various parameters for the digital video clip (such as the format of the digital video clip). As a result of these selections, the particular digital video clip desired by the user may be generated "on the fly" for purchase/license by the user, as is discussed in FIG. 2.

Figure 2:
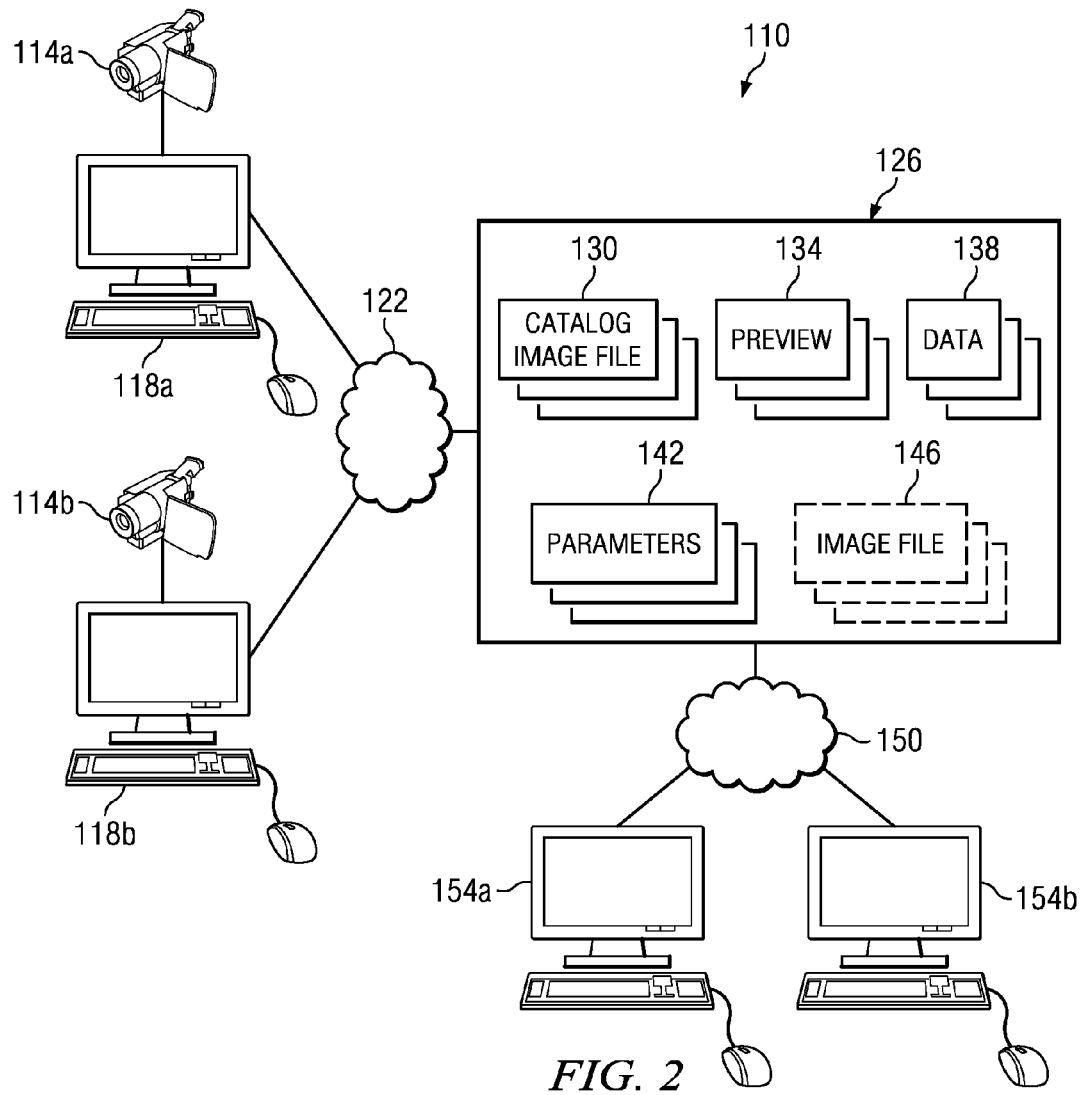
FIG. 2 illustrates an example system for selling or licensing image files according to a particular embodiment.

FIG. 2 illustrates an example system 100 for selling or licensing image files according to a particular embodiment. According to the illustrated embodiment, system 100 includes generation system 126, catalog image file 130, and image file 146. In particular embodiments, generation system 126 is capable of using a stored catalog image file 130 in order to generate image file 146 "on the fly." Since generation system 126 is capable of generating image 146 "on the fly," in particular embodiments, generation system 126 does not need to store a large quantity of image files 146 of different formats in order to provide them to a user. Instead, image file 146 may be generated specifically for the user, and then image file 146 may be deleted from storage. In particular embodiments, this may allow generation system 126 to provide a user with a file having a desired format without having to store each of these image files 146 at generation system 126. This embodiment may be particularly useful for video files. There are hundreds of formats for digital video files in common use today. For a website marketing stock footage, the cost of storage of files in many different formats is prohibitive.

The embodiment disclosed herein allows efficient provision of digital video images to those purchasing or otherwise wishing to receive a copy of such digital video images. Users can obtain a copy of the digital video images in their desired format without the service provider of the digital video images storing dozens of copies of the digital video images in a myriad of formats. Instead, video images may be created on the fly in many different formats.

According to the illustrated embodiment, system 100 further includes one or more cameras 114 (114a, 114b), one or more transmission systems 118 (118a, 118b), network 122, network 150, and one or more user systems 154 (154a, 154b). Camera 114 includes any device capable of generating a file in a useable image format (e.g., a raw image format). For example, camera 114 may include a Canon EOS-1D, a Fujifilm FinePix S5100/5500, a Nikon Coolpix 5400, a RED ONE (REDCODE), or any other device capable of generating a file in a useable image format (e.g., a raw image format). A file in a raw image format may refer to a digital image file that has not yet been processed or has only been minimally processed. In particular embodiments, such a file may not be directly usable as an image, but may have all the information needed to create an image. In particular embodiments, such a file may have more information than is needed to create an image, such as infra-red information, ultra-violet information, other image related information, or more color information than is visible by the human eye or displayable on electronic displays. In particular embodiments, such a file may be a digital negative. In particular embodiments, the file in a raw image format may be compressed or not compressed. According to the illustrated embodiment, the file in a raw image format or other image format created by camera 114 may be referred to as catalog image file 130, which is transmitted to and stored at generation system 126. Of course, catalog image files 130 may be uploaded from any source to generation system 126 (or otherwise provided to generation system 126) without coming directly from a camera 114.

In particular embodiments, camera 114 may generate any digital image file as catalog image file 130. For example, camera 114 may generate a digital video file, a digital picture file, a digital motion picture (cinematography) file, a digital multimedia file, any other digital image file, or any combination of the preceding.

In particular embodiments, camera 114 may be further capable of communicating catalog image file 130. For example, camera 114 may communicate catalog image file 130 to transmission system 118 for subsequent transmission to generation system 126. Camera 114 may communicate catalog image file 130 to transmission system 118 in any manner. For example, camera 114 may have a removable memory unit that may be removed from camera 114 and inserted into transmission system 118. As another example, camera 114 may be coupled to transmission system 118 in order to communicate catalog image file 130 to transmission system 118. In particular embodiments, camera 114 may be coupled to transmission system 118 through a wired connection, allowing catalog image file 130 to be communicated from camera 114 to transmission system 118. In further embodiments, camera 114 may be coupled to transmission system 118 through a network (such as networks 122 and 150 discussed below) in order to communicate catalog image file 130 to transmission system 118.

Although system 100 illustrates camera 114 coupled to transmission system 118, in particular embodiments, camera 114 may be directly coupled to generation system 126. In such embodiments, camera 114 may directly communicate catalog image file 130 to generation system 126 for storage. Furthermore, catalog image file 130 may be communicated (directly or indirectly) to transmission system 118 and/or generation system 126 in any other manner. For example, catalog image file 130 may be communicated by any device, such as a Smart Phone, a portable storage unit (such as a memory card), additional computer systems, or any other device.

Transmission system 118 may include any device capable of receiving catalog image file 130 from camera 114 or from computers or other digital devices (e.g., Smart Phones) and transmitting catalog image file 130 to generation system 126. In particular embodiments, transmission system 118 may be a computer system. Example computer systems may include a desktop computer system, a laptop or notebook computer system, a collection of network devices, an interactive kiosk (e.g. such as a standalone kiosk located in a store or shopping center), a mainframe, a mesh of computer systems, a mobile telephone, a personal digital assistant (PDA), a server, any other computer system, or any combination of the preceding. According to the illustrated embodiment, transmission system 118 may receive catalog image file 130 from camera 114 or other devices, and may subsequently transmit catalog image file 130 to generation system 126 over network 122. In some embodiments, generation system 126 and transmission system 118 will be on the same computer or group of computers and may not use network 122. For example, both generation system 126 and transmission system 118 may be the same standalone kiosk. As such, a user may provide catalog image file 130 to the kiosk so as to purchase and/or license an image file 146 having any desired format from the kiosk. Additional details regarding the computer system of particular embodiments of transmission system 118 are discussed below with regard to FIG. 4.

Network 122 may include any network capable of connecting transmission system 122 to generation system 126. Network 122 may refer to any interconnecting system capable of transmitting audio, video, signals, data, messages, or any combination of the preceding. Network 118 may include all or a portion of a server backplane, a high-speed switch fabric, a public switched telephone network (PSTN), a public or private data network, a local area network (LAN), a metropolitan area network (MAN), a wide area network (WAN), a local, regional, or global communication or computer network such as the Internet, wireline or wireless network, and enterprise intranet, other communication link, or any combination of two or more of these. Although FIG. 2 illustrates network 122 and transmission system 118 as being separate, in particular embodiments, network 122 and transmission system 118 may be integrated.

Generation system 126 may include any device capable of generating image file 146 using catalog image file 130. For example, generation system 126 may include a computer system. Example computer systems may include a desktop computer system, a laptop or notebook computer system, an interactive kiosk (e.g. such as a standalone kiosk located in a store or shopping center), a mainframe, a network of multiple computers including or excluding servers, a mesh of computer systems, a mobile telephone, a PDA, a server, any other computer system, or any combination of the preceding. In particular embodiments, once image file 146 is generated by generation system 126, generation system 126 may be further capable of transmitting image file 146 to user system 154 over network 150. Additional details regarding the computer system of particular embodiments of generation system 126 are discussed below with regard to FIG. 4.

Network 150 may include any network capable of connecting generation system 126 to user system 154. Network 150 may refer to any interconnecting system capable of transmitting audio, video, signals, data, messages, or any combination of the preceding. Network 150 may include all or a portion of a server backplane, a high-speed switch fabric, a PSTN, a public or private data network, a LAN, a MAN, a WAN, a local, regional, or global communication or computer network such as the Internet, wireline or wireless network, and enterprise intranet, other communication link, or any combination of two or more of these. Furthermore, although FIG. 2 illustrates network 150 and network 122 as different networks, in particular embodiments, network 150 and network 122 may be the same network.

According to the illustrated embodiment, generation system 126 includes one or more catalog image files 130, one or more previews 134, data 138, one or more parameters 142, and one or more image files 146. As is discussed above, catalog image file 130 includes a file in one image format, such as, for example, a raw image format. In particular embodiments, catalog image file 130 may have a raw image format such as 3FR (Hasselblad), DCR, K25, KDC (Kodak), CR2 (Canon), ERF (Epson), R3D (RED DIGITAL CINEMATOGRAPHY), NEF (Nikon), ARRIRAW (Arri), any other useable image format, or any combination of the preceding. As is also discussed above, catalog image file 130 may include any type of digital image file in a same type of image format. For example, catalog image file 130 may include a video file, a digital picture file, a digital motion picture (cinematography) file, a digital multimedia file, any other digital image file, or any combination of the preceding.

In particular embodiments, catalog image file 130 may be received by generation system 126 and stored by generation system 126. As such, in particular embodiments, generation system 126 may be capable of generating image files 146 using catalog image file 130, as is discussed below.

Preview 134 may include any type of preview of catalog image file 130. For example, preview 134 may be a processed version of catalog image file 130. It can be stored or generated on the fly. It can be all or a part of the content. For example, if catalog image file 130 is a five minute digital video file, preview 134 may be only a portion of catalog image file 130, such as a processed three-second preview of catalog image file 130. As such, preview 134 may provide an example of the content of catalog image file 130, but may be processed in such a way so as to not require a large quantity of storage space.

In particular embodiments, generation system 126 may generate preview 134 by processing catalog image file 130. For example, generation system 126 may compress, optimize, provide any color profile, conduct any other processing, or conduct any combination of the preceding to catalog image file 130 in order to generate preview 134. In particular embodiments, by processing catalog image file 130 in order to generate preview 134, preview 134 may be viewable by a user, such as a user utilizing user system 154. For example, a user may utilize a web browser on user system 154 in order to view preview 134 stored by generation system 126. In particular embodiments, preview 134 may be viewed without installing any special software. In particular embodiments, after generation system 126 generates preview 134, generation system 126 may be capable of storing preview 134.

Data 138 may include any data generated by generation system 126 from catalog image file 130. For example, data 138 may include information extracted from catalog image file 130, and generated in a format viewable by a user, such as in text form. In particular embodiments, the information extracted from catalog image file 130 may include metadata from catalog image file 130, such as the image file identifier, duration, description, producer, contributor, cinematographers, resolution, frame rate, format, framing, shot location, date, time stamp, frame width, frame height, saturation, contrast, brightness, shutter speed, any other metadata from catalog image file 130, or any combination of the preceding. In particular embodiments, by extracting and generating such metadata in text form, a user may be able to more easily view and understand each item of metadata. For example, data 138 may include a title of an item of metadata (such as "image file identifier:") and further include the item of metadata (such as the image file identifier) next to the title, thus presenting this item of metadata in a more understandable format. In particular embodiments, data 138 may be generated by extracting all (or a portion) of the metadata from catalog image file 130. In particular embodiments, data 138 may be generated on the fly for a user or stored in the system and linked to a catalog image file 130.

In particular embodiments, after data 138 is generated, data 138 may be viewable by a user utilizing user system 154. For example, a user may be able to view data 138 on a web browser using user system 154. As such, the user may be able to view any (or all) information from catalog image file 130. In particular embodiments, this may allow a user to request generation of image file 146 for purchase or license.

Parameters 142 may include any parameters that may be used by generation system 126 in order to generate image file 146 from catalog image file 130. In particular embodiments, parameters 142 may include any information that may allow catalog image file 130 to be processed into image file 146. For example, parameters 142 may include compression, color, contrast, brightness, resolution (such as standard definition, hi-definition 720, hi-definition 1080, or any other resolution), gamma, frame rate, technical specifications, artistic expressions (such as particular colors), file options, shadow, dynamic range enhancement, saturation, exposure, file format, any other information that may be used to process catalog image file 130, or any combination of the preceding. In particular embodiments, parameters 142 may be referred to as grading, and format parameters. In particular embodiments, file format may refer to a format, a file type, a file standard, a file extension, a codec, any manner of encoding a file for storage, or any combination of the preceding. Examples of a file format may include FCPi Pro Res 4444, Pro Res 422, JPEG, PICVideo, OpenAVS, QuickTime H.264, RealVideo, DPX, any other file format, or any combination of the preceding.

In particular embodiments, parameters 142 may allow generation system 126 to create a particular image file 146. For example, a user of user system 154 may select a file format, a resolution, a contrast, a compression, and a color type as parameters 142, and generation system 126 may use these parameters 142 in order to generate image file 146. Accordingly, image file 146 may have the file format, resolution, contrast, brightness, and compression selected by the user.

In particular embodiments, parameters 142 may be selected in any manner. For example, a user may input parameters 142 and transmit parameters 142 to generation system 126. As another example, parameters 142 may be displayed to a user of user system 154 and the user may select (such as highlighting a particular parameter, clicking a box next to the parameter, or any other selection format) which parameters 142 should be used to generate image file 146.

Image file 146 includes any file that may be generated by generation system 126 based on catalog image file 130. In particular embodiments, image file 146 may be a processed version of catalog image file 130. For example, as is discussed above, catalog image file 130 may include an image file that is unusable as an image because it has not been processed (or has been minimally processed). In such an example, image file 146 may include any processed version of catalog image file 130. In particular embodiments, image file 146 may include a version of catalog image file 130 that has been processed using parameters 142. For example, if the selected parameters 142 indicate a particular file format and a particular resolution, image file 146 may be a version of catalog image file 130 processed to have that particular format and that particular resolution.

In particular embodiments, image file 146 may be a version of catalog image file 130 processed according to any parameters 142. For example, image file 146 may have any compression, color, contrast, brightness, file standard, file type, file format, resolution, gamma, technical specifications, artistic expressions, any other information that may be used to process catalog image file 130, or any combination of the preceding.

In particular embodiments, image file 146 may be generated on the fly in any manner. For example, image file 146 may be generated by utilizing catalog image file 130, parameters 142, and any processing code for trans-coding catalog image file 130 in order to generate image file 146. For example image file 146 may be generated using any code provided by a maker of camera 114, such as RED, Nikon, Olympus, Fuji, Panasonic, or any other software provider.

In particular embodiments, image file 146 is generated "on the fly." In particular embodiments, "on the fly" may refer to generating image file 146 upon receiving both catalog image file 130 and parameters 142. Thus, once both catalog image file 130 and parameters 142 are received (or stored) at generation system 126, generation system 126 may utilize catalog image file 130 and parameters 142 in order to generate image file 146 in response to a request from a specific user. In particular embodiments, this may allow image file 146 to not have to be stored on a permanent or long-term basis at generation system 126. For example, catalog image file 130 may be processed into hundreds of variations, wherein each variation is an image file 146. Therefore, instead of permanently (or long-term) storing each of these image files 146, generation system may merely store catalog image file 130 and parameters 142, allowing each of these hundreds of image files 146 to be generated "on the fly" and provided to the requesting user. This creates the advantage of catering to user's desires without a huge storage expense.

In particular embodiments, once image file 146 has been generated by generation system 126, image file 146 may be transmitted to user system 154 through network 150 or otherwise delivered to the user.

User system 154 may include any device capable of allowing user to select parameters 142, and further capable of receiving image file 146. In particular embodiments, user system 154 may be a computer system. Example computer systems may include a desktop computer system, a laptop or notebook computer system, an interactive kiosk, a mainframe, a mesh of computer systems, a mobile telephone, a PDA, a server, any other computer system, or any combination of the preceding. Additional details regarding the computer system of particular embodiments of user system 154 are discussed below with regard to FIG. 4.

Although system 100 illustrates transmission systems 118 and user systems 154 as separate systems, in particular embodiments, they may be the same system. For example, in particular embodiments, the system that transmits catalog image file 130 to generation system 126 may be the same system that requests image file 146. In such an example, a user may create catalog image file 130 with camera 114, and may process catalog image file 130 into any image file 146 without having to install any processing software on their own computer. Instead, the user may merely provide catalog image file 130 and a selection of parameters 142 to generation system 126, resulting in the user receiving image file 146 back from generation system 126.

Although system 100 illustrates parameters 142 as being provided by user system 154, in particular embodiments, parameters 142 may be provided entirely by transmission system 118 or may be provided from both transmission system 118 and user system 154. For example, a user may generate catalog image file 130 using camera 114, and upload catalog image file 130 to generation system 126 along with one or more parameters 142 that may indicate an artistic interpretation of the content of catalog image file 130. In such an example, if the creator of catalog image file 130 wants one or more users of user system 154 to be able to access an image file 146 having parameters 142 designated by the creator of catalog image file 130, the creator of catalog image file 130 may upload such parameters 142 to generation system 126.

In particular embodiments, generating image file 146 at generation system 126 may provide one or more technical advantages. For example, by generating image file 146 "on the fly" at generation system 126, generation system 126 may have reduced storage capacity requirements. In particular, in order to provide a user with the ability to select from various versions of the same video clip (or any other image file 146), computer systems typically provide long-term storage for various selectable versions of the video clip. Therefore, in order to provide a user with a selection of 30 file formats, 5 color profiles, and 10 resolutions for a single clip (having a file size of one gigabyte (GB)), a computer system would typically need to have at least 1,500 GBs of storage for the versions of that single clip (1 GB×30×5×10=1,500 GBs). Because the computer system would need 1,500 GBs of storage for only the single clip, to provide a user with the ability to select from 100 different types of clips (each with the same amount of selectable formats, color profiles, and resolutions), the computer system might require at least 150 terabytes (TB) of storage capacity—a large amount of storage for a small number of clips.

In particular embodiments, generation system 126 may provide the same format selections to a user, but require significantly less storage to provide those choices. In particular, because generation system 126 may generate image files 146 "on the fly," generation system 126 may provide long-term storage for one catalog image file 130 (or just a couple such files). Such a file or files may be used in order to generate any desired image file 146. Using this catalog image file 130 and the parameters 142 selected by a user (which specify the requested file format, color profile, resolution, and any other parameter(s)), generation system 126 may generate the particular image file 146 desired by the user, and provide that image file 146 to the user. Thus, the disclosed system greatly reduces the need for long-term storage of all the different image files 146. Instead, generation system 126 may generate each particular image file 146 "on the fly" for each particular user. In particular embodiments, this may significantly reduce the amount of storage capacity needed in order to provide user system 154 with a selection of formats to choose from.

Modifications, additions, or omissions may be made to system 100 without departing from the scope of the disclosure. The components of system 100 may be integrated or separated. Moreover, the operations of system 100 may be performed by more, fewer, or other components. For example, the operations of generation system 126 may be performed by more than one component. As used in this document, (each) refers to each member of a set or each member of a subset of a set.

Figure 3:
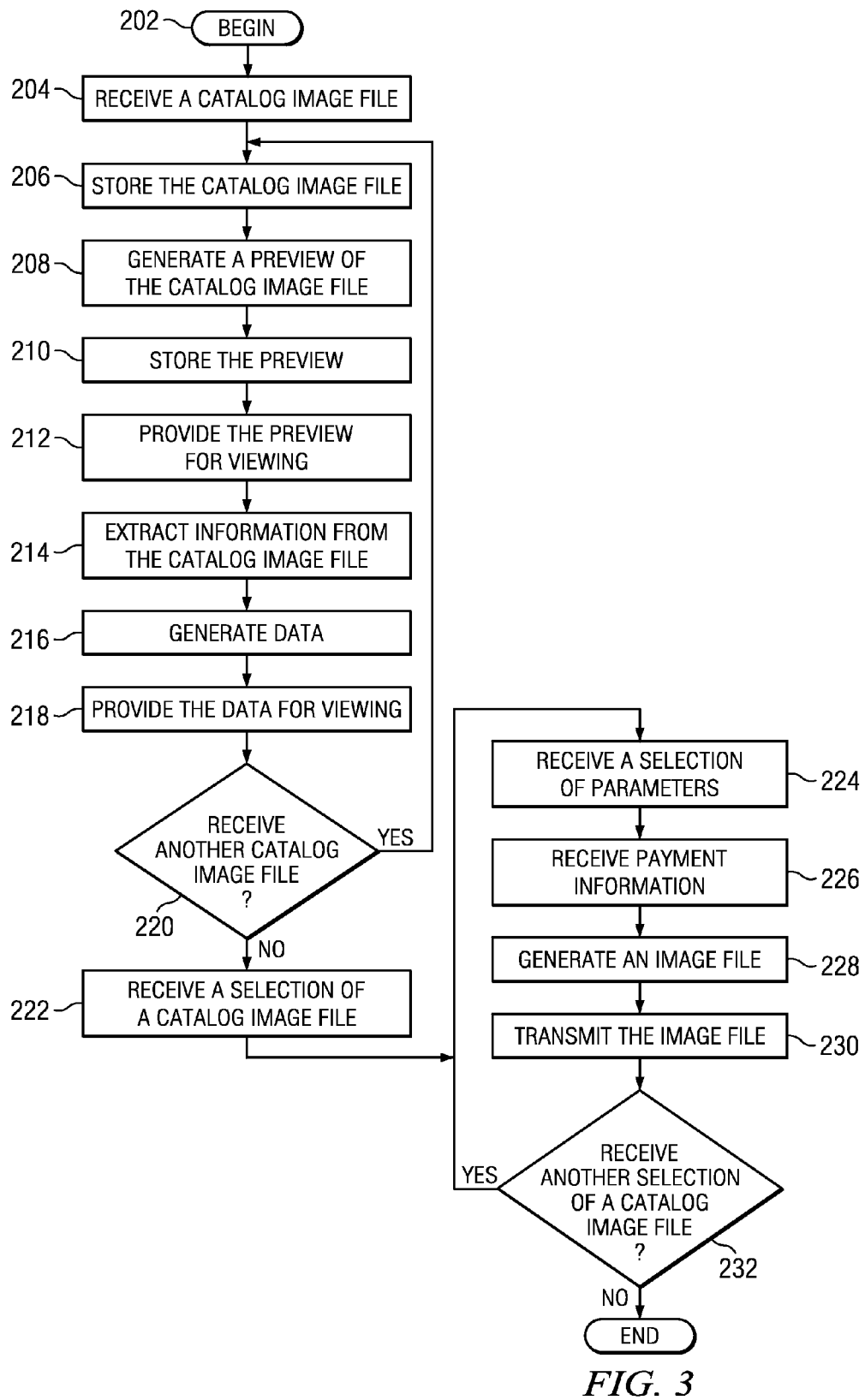
FIG. 3 illustrates an example method for selling or licensing image files according to a particular embodiment.

FIG. 3 illustrates an example method 200 for selling or licensing image files according to a particular embodiment. In particular embodiments, method 200 may include selling or licensing image files generated on the fly. In particular embodiments, method 200 may be performed by generation system 126 of FIG. 2.

The method begins at step 202. At step 204, a catalog image file is received. In particular embodiments, the catalog image file is received by a first computer system. In particular embodiments, a catalog image file may represent any file in a catalog image format, such as a digital video file, a digital picture file, a digital motion picture (cinematography) file, a digital multimedia file, any other digital image file, or any combination of the preceding. In particular embodiments, the catalog image file may be in a raw image file format. In particular embodiments, the catalog image file may be received from any device, such as another computer system, a camera, a Smart Phone, or any other device.

At step 206, the catalog image file is stored. In particular embodiments, the catalog image file may be stored by the first computer system. After the catalog image file is stored, the method moves to step 208. At step 208, a preview of the catalog image file is generated. In particular embodiments, a preview may be a smaller version of the catalog image file. For example, if the catalog image file is a video that is four minutes long, the preview may be only a few seconds. In particular embodiments, the preview may be generated by processing the catalog image file in any manner. For example, the preview may be generated by compressing, optimizing, providing any color profile, conducting any other processing method, or conducting any combination of the preceding to the catalog image file in order to generate the preview. In particular embodiments, the preview is generated for viewing on a web browser.

At step 210, the preview is stored. In particular embodiments, the preview may be stored by the first computer system. In particular embodiments, once a preview is stored (and until the image file is generated), the only files that are both stored by the first computer system and are a version of the catalog image file are the catalog image file, itself, and the preview. For example, instead of storing a large quantity of versions of the catalog image file in order to provide a selection of these versions to users, the computer system may only store the catalog image file, itself, and a preview of the catalog image file. This may reduce the amount of storage required by the first computer system. Furthermore, the computer system may still be able to provide a selection of each version of the catalog image file by generating each version (as an image file) on the fly. Although step 210 includes storing the preview, in particular embodiments, the preview may not be stored in long-term storage. For example, instead of storing the preview, the preview of the catalog image file may be generated on the fly for viewing on the web browser each time a user accesses the web browser. As such, the preview may not need to be stored in long-term storage. Instead, it is generated and provided for viewing on the fly.

At step 212, the preview is provided for viewing. In particular embodiments, the preview is capable of being viewed using a web browser. For example, a user may access and view the preview using a web browser on their computer. As such, the user may be able to view the preview, allowing them to see a sample of the catalog image file for which they may submit parameters for.

At step 214, information is extracted from the catalog image file. In particular embodiments, the information may include metadata from the catalog image file, such as the image file identifier, duration, description, producer, contributor, cinematographers, resolution, frame rate, format, framing, shot location, date, time stamp, frame width, frame height, saturation, contrast, brightness, shutter speed, any other metadata from the catalog image file, or any combination of the preceding. In particular embodiments, all (or a portion) of the metadata from the catalog image file may be extracted.

At step 216, data representing the extracted information may be generated. In particular embodiments, the data may represent the extracted information in text form. In particular embodiments, by generating such metadata in text form, a user may be able to more easily view and understand each item of metadata. For example, the generated data may include a title of the metadata (such as "image file identifier:") and further include the item of metadata (such as the image file identifier) next to the title, thus presenting this item of metadata in a more understandable format. In particular embodiments, after the data is generated, the data may be stored by the first computer system. Although step 216 includes storing the generated data, in particular embodiments, the generated data may not be stored in long-term storage. For example, instead of storing the generated data, the generated data may be generated on the fly for viewing on the web browser each time a user accesses the web browser. As such, the generated data may not need to be stored in long-term storage. Instead, information may be extracted from the catalog image file on the fly, data representing the extracted information may be generated on the fly, and the generated data may be provided for viewing on the fly.

At step 218, the generated data is provided for viewing. In particular embodiments, the data may be provided for viewing using a web browser. For example, a user may access and view the generated data using a web browser on their computer. As such, the user may be able to view the generated data, allowing them to better understand the information of a raw image file.

At step 220, another catalog image file is received. As such, steps 204-218 may be repeated for the additional catalog image file. In particular embodiments, steps 204-218 may be repeated for any number of catalog image files, such as two catalog image files, ten catalog image files, 100 catalog image files, or any other number of catalog image files. Accordingly, in particular embodiments, a viewer may be able use a web browser in order to view each of the previews so as to decide which image file the user desires to purchase or license. In particular embodiments, one or more of the catalog image files may be received from different devices. For example, a first catalog image file may be received from a first provider using a particular computer system (or other device) and a second catalog image file may be received from a second provider using a different computer system (or other device). As such, in particular embodiments, various providers may communicate their catalog image files to the first computer system so that one or more users can purchase or license image files generated on the fly based on the catalog image files.

In particular embodiments, after the generated data for all of the received catalog image files is provided for viewing at step 218, steps 222-230 may be performed for one or more of the stored catalog image files. For example, steps 222-230 may be performed for each of the catalog image files, or only a portion of the catalog image files, as is discussed below.

At step 222, a selection of a catalog image file is received. In particular embodiments, the selection of the catalog image file may be received from a user that desires to purchase or license an image file generated from the catalog image file. In particular embodiments, the selection may be received based on any method of selection. For example, a user may type in the name or identifier of the catalog image file, the user may highlight the catalog image file displayed in a list, the user may click a button that specifies the catalog image file, the user may click on a preview of the catalog image file, or the user may perform any other method of selection.

Once the selection of the catalog image file is received, a selection of parameters is received at step 224. In particular embodiments, the selection of parameters may include a selection of any type of parameters that may be used to generate an image file from a catalog image file. For example, the selection of parameters may include a selection of compression, color, contrast, brightness, resolution, gamma, frame rate, technical specifications, artistic expressions, file options, shadows, dynamic range enhancements, saturation, exposure, file formats, any other information that may be used to generate an image file, or any combination of the preceding. In particular embodiments, the parameters may specify a particular file format for the image file. In particular embodiments, the selection may be received based on any method of selection. For example, a user may type in the desired parameter(s), the user may highlight the parameter(s) displayed in a list, the user may click a button that specifies the parameter(s), or the user may perform any other method of selection.

Once the selection of the parameters is received, payment information may be received at step 226. In particular embodiments, payment information may refer to any information that can be used to purchase or license an image file. For example, payment information may include credit/debit card information, account information (such as a number of credits to deduct from an account linked with the user), wire transfer information, cash delivery information, an address where a bill for the purchase/license can be sent to, or any other information used to purchase or license an image file. In further embodiments, payment information may include verification that the user desires to purchase or license the image file.

At step 228, an image file is generated. In particular embodiments, the image file is generated on the fly. In particular embodiments, the image file is generated using the catalog image file and the selected parameters. In particular embodiments, the generated image file is a version of the catalog image file. For example, the generated image file may be a version of the digital video of the catalog image file. In particular, as is stated above, the catalog image file may represent, for example, a digital video in a raw image format. As such, the generated image file may be a version of this digital video processed according to the selected parameters. As an example, the selected parameters may include a format type. In such an example, the image file may be the same digital video as the catalog image file, but may have the selected format type (instead of having the catalog image format). In particular embodiments where the selected parameters further specify a resolution, compression, and/or a color profile, the generated image file may further have the selected resolution, the selected compression, and/or the selected color profile. As such, the generated image file may be a processed version of a catalog image file. Furthermore the generated image file may be processed according to the parameters selected in step 224.

At step 230, the generated image file is transmitted. In particular embodiments, the generated image file is transmitted to a second computer system, such as a computer system that is associated with the user that requested the image file for purchase or license. In particular embodiments, after the generated image file is transmitted, the generated image file and any other version of the catalog image file (other than the catalog image file, itself, and, in particular embodiments, the preview) may be deleted from storage by the first computer (or maintained for a short time period for quality control, audit, or other purposes). As such, the generated image file may be stored by the first computer system only until the generated image file is transmitted to the second computer system. In particular embodiments, this may reduce the amount of storage required by the first computer system.

At step 232, it is determined whether another selection of a catalog image file is received. If another selection of a catalog image files is received, steps 224-230 are repeated so as to generate another image file and transmit that image file. In particular embodiments, another selection of a catalog image file is received when a user desires to receive a different version of the catalog image file. For example, by repeating steps 224-230 for each selection of the catalog image file, a first user may be able to receive a version of the catalog image file having particular specifications (such as a first format type), and a second user (or even the first user) may also be able to receive another version of the catalog image file having different specifications (such as a second format type).

In particular embodiments, another selection of a catalog image file may be received when a user desires to receive a version of a different catalog image file. For example, if a first user receives a version of a particular catalog image file that includes a digital video of a whale swimming in the ocean, a second user (or even the first user) may also be able to receive a version of another catalog image file that includes a digital video of a person skiing.

In particular embodiments, another selection of a catalog image file may be received when a user desires to receive the same exact version of the same exact file. For example, if a first user receives a version of a particular catalog image file, a second user (or even the first user) may also be able to receive the same version of the same catalog image file. In particular, as discussed above, the computer system may only store the generated image file until the generated image file is transmitted to the requesting computer. As such, if the same image file is requested again (such as by a different user or even the same user) that file can be generated again. In order to do so, in particular embodiments, the user may provide a second selection of the parameters, where the second selection may be substantially identical to the first selection discussed above. In particular embodiments, "substantially identical" to the first selection may refer to a selection that has the same content as the first selection. For example, the selection may indicate the same parameters (such as the same file format and the same compression) as the first selection. In particular embodiments, the only difference (if any) between the two selections of parameters may be negligible information and metadata, such as time stamps for when the selection was entered. Once the second selection is entered (and any other information is received, as is discussed above), the computer system may generate an additional image file. In particular embodiments, the additional image file is substantially identical to the previously generated image file. In particular embodiments, "substantially identical" to the previously generated image file may refer to an image file that is generated using the same catalog image file and substantially identical parameters. As such, the additional image file may look identical to the previously generated image file. In particular embodiments, the only difference (if any) may be negligible information and metadata, such as time stamps for when the additional image file was generated.

As is discussed above, if the same image file is requested again (such as by a different user or even the same user) that file can be generated again. In particular embodiments, if the same image file is requested again, it may not be re-generated. For example, each generated image file may be temporarily stored after it is generated. As such, if the same image file is requested again while the image file is in temporary storage, a copy of the image file already in storage may be provided to the requestor. In further embodiments, if the same image file is requested repeatedly, the image file may be stored in long-term memory. As such, this same image file may not need to be re-generated each time it is requested.

Returning back to step 232, if it is determined that another selection of a catalog image file has not been received, the method moves to step 234. At step 234, the method ends.

Although the present disclosure describes or illustrates particular operations as occurring in a particular order, the present disclosure contemplates any operations occurring in any order. Moreover, the present disclosure contemplates any operations being repeated one or more times in any order. Although the present disclosure describes or illustrates particular operations as occurring in sequence, the present disclosure contemplates any operations occurring at substantially the same time, where appropriate. Any operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 4:
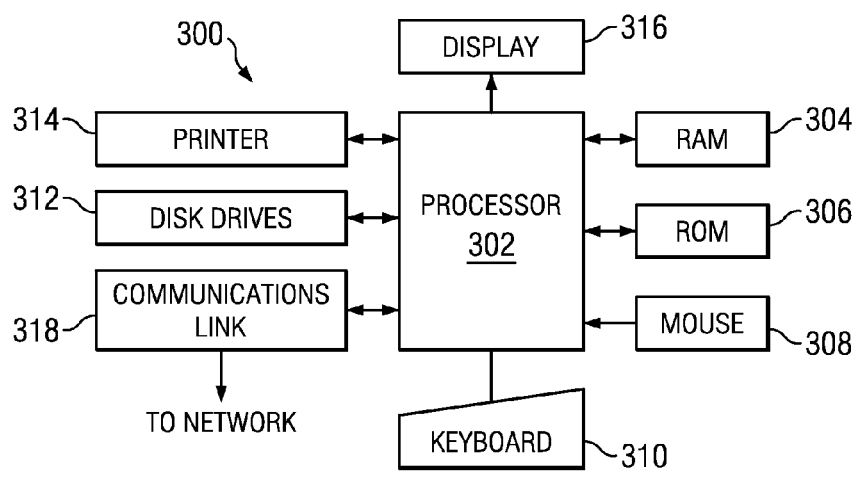
FIG. 4 illustrates an example computer system for selling or licensing image files according to a particular embodiment.

FIG. 4 illustrates an example computer system 300 for generating image files using catalog image files according to a particular embodiment. In particular embodiments, transmission system 118, generation system 126, and/or user system 154 of FIG. 2 may include one or more computer systems 300 for performing one or more of the operations of transmission system 118, generation system 126, and/or user system 154. In particular embodiments, computer system 300 may be used in connection with one or more pieces of software in order to provide the operations discussed in this disclosure.

Computer system 300 may generally be adapted to execute any of the well-known OS2, UNIX, Mac-OS, Linux, and Windows Operating Systems or other operating systems. The computer system 300 in this embodiment comprises a processor 302, a random access memory (RAM) 304, a read only memory (ROM) 306, a mouse 308, a keyboard 310 and input/output devices such as a printer 314, disk drives 312, a display 316 and a communications link 318. In other embodiments, the computer system 300 may include more, less, or other component parts. Embodiments of the present disclosure may include programs that may be stored in the RAM 304, the ROM 306 or the disk drives 312 and may be executed by the processor 302. The communications link 318 may be connected to a computer network or a variety of other communicative platforms including, but not limited to, a public or private data network; a LAN; a MAN; a WAN; a wireline or wireless network; a local, regional, or global communication network; an optical network; a satellite network; an enterprise intranet; other communication links; or any combination of the preceding. Disk drives 312 may include a variety of types of storage media such as, for example, floppy disk drives, hard disk drives, CD ROM drives, DVD ROM drives, magnetic tape drives or other storage media.

Although FIG. 4 provides one embodiment of a computer that may be used with the disclosure, the disclosure may additionally use any other computer systems. Additionally, embodiments of the disclosure may also employ multiple computer systems 300 or other computers networked together in a computer network. Most commonly, multiple computer systems 300 or other computers may be networked through the Internet and/or in a client server network. Embodiments of the disclosure may also be used with a combination of separate computer networks each linked together by a private or a public network.

Several embodiments may include logic contained within a medium. In the embodiment of FIG. 4, the logic comprises computer software executable on the computer system 300. The medium may include the RAM 304, the ROM 306 or the disk drives 312. In other embodiments, the logic may be contained within hardware configuration or a combination of software and hardware configurations. The logic may also be embedded within any other medium without departing from the scope of the disclosure.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A method for selling or licensing digital video clips, comprising:
receiving, by a first computer system, a first catalog image file representing first digital video in a digital negative image format;
receiving, by the first computer system, a second catalog image file representing second digital video in a digital negative image format, wherein the first catalog image file and the second catalog image file are received from different devices;
for the first catalog image file:
receiving, from a second computer system, a selection of the first catalog image file;
receiving, from the second computer system, a selection of one or more first parameters, wherein at least one of the first parameters specifies a second format for the first catalog image file;
receiving, from the second computer system, payment information for a purchase or a license of a first image file that is a version of the first catalog image file, the first image file having the second format;
after receiving the selection of the first parameters and the payment information for the purchase or the license of the first image file, generating, by the first computer system, the first image file, wherein generating the first image file comprises processing the first catalog image file based on the first parameters;
transmitting, by the first computer system, the first image file to the second computer system;
generating, by the first computer system, a preview of the first catalog image file for display on a web browser, wherein the preview of the first catalog image file comprises a portion of the first catalog image file;
providing, by the first computer system, the preview of the first catalog image file for display on the web browser;
storing, by the first computer system, the first catalog image file;
storing, by the first computer system, the preview of the first catalog image file, wherein, until the first image file is generated by the first computer system, the only files that are both stored by the first computer system and are a version of the first catalog image file are the first catalog image file and the preview of the first catalog image file; and
wherein the first image file is stored by the first computer system only until the first image file is transmitted to the second computer system, wherein the transmission of the first image file to the second computer system causes the first image file to be deleted from storage by the first computer system.

2. The method of, claim 1, further comprising, for the first catalog image file: receiving, from a third computer system, a second selection of the first catalog image file; receiving, from the third computer system, a selection of one or more second parameters, wherein at least one of the second parameters specifies a third format for the first catalog image file; receiving, from the third computer system, second payment information for a purchase or a license of a second image file that is a version of the first catalog image file, the second image file having the third format; after receiving the selection of the second parameters and the second payment information for the purchase or the license of the second image file, generating, by the first computer system, the second image file, wherein generating the second image file comprises processing the first catalog image file based on the second parameters; and transmitting, by the first computer system, the second image file to the third computer system.

3. The method of, claim 1, further comprising, for the first catalog image file: receiving, from a third computer system, a second selection of the first catalog image file; receiving, from the third computer system, a selection of one or more second parameters, wherein the selection of the second parameters is substantially identical to the selection of the first parameters; receiving, from the third computer system, second payment information for a purchase or a license of a second image file that is a version of the first catalog image file, wherein the second image file is substantially identical to the first image file; after receiving the selection of the second parameters and the second payment information for the purchase or the license of the second image file, generating, by the first computer system, the second image file, wherein generating the second image file comprises processing the first catalog image file based on the second parameters; and transmitting, by the first computer system, the second image file to the third computer system.

4. The method of, claim 1, further comprising, for the first catalog image file: extracting, by the first computer system, information from the first catalog image file; generating, by the first computer system, data representing the extracted information for display on a web browser, the data representing the extracted information being in text form; and providing the data representing the extracted information for display on the web browser.

5. The method of, claim 1, wherein: the first parameters further specify a resolution, a compression, and a color profile; and the first image file further has the resolution, the compression, and the color profile.

6. The method of, claim 1, wherein the second format for the first catalog image file comprises a file format selected from a group consisting of: FCP Pro Res 4444; Pro Res 422; JPEG; PICVideo; OpenAVS; QuickTime H.264; RealVideo; and DPX.

7. A system, comprising: a first computer system including: one or more non-transitory, computer-readable memory units operable to store one or more instructions; and a processor operable, upon execution of the one or more instructions, to: receive a first catalog image file representing first digital video in a digital negative image format; receive a second catalog image file representing second digital video in a digital negative image format, wherein the first catalog image file and the second catalog image file are received from different devices; for the first catalog image file: receive, from a second computer system, a selection of the first catalog image file; receive, from the second computer system, a selection of one or more first parameters, wherein at least one of the first parameters specifies a second format for the first catalog image file; receive, from the second computer system, payment information for a purchase or a license of a first image file that is a version of the first catalog image file, the first image file having the second format; after receiving the selection of the first parameters and the payment information for the purchase or the license of the first image file, generate the first image file, wherein the processor operable, upon execution of the one or more instructions, to generate the first image file comprises the processor operable, upon execution of the one or more instructions, to process the first catalog image file based on the first parameters; transmit the first image file to the second computer system; generate a preview of the first catalog image file for display on a web browser, wherein the preview of the first catalog image file comprises a portion of the first catalog image file; provide the preview of the first catalog image file for display on the web browser; store the first catalog image file; store the preview of the first catalog image file, wherein, until the first image file is generated by the first computer system, the only files that are both stored by the first computer system and are a version of the first catalog image file are the first catalog image file and the preview of the first catalog image file; and wherein the first image file is stored by the first computer system only until the first image file is transmitted to the second computer system, wherein the transmission of the first image file to the second computer system causes the first image file to be deleted from storage by the first computer system.

8. The system of claim 7, wherein the processor is further operable, upon execution of the one or more instructions, to: for the first catalog image file:
receive, from a third computer system, a second selection of the first catalog image file;
receive, from the third computer system, a selection of one or more second parameters, wherein at least one of the second parameters specifies a third format for the first catalog image file;
receive, from the third computer system, second payment information for a purchase or a license of a second image file that is a version of the first catalog image file, the second image file having the third format;
after receiving the selection of the second parameters and the second payment information for the purchase or the license of the second image file, generate the second image file, wherein the processor operable, upon execution of the one or more instructions, to generate the second image file comprises the processor operable, upon execution of the one or more instructions, to process the first catalog image file based on the second parameters; and
transmit the second image file to the third computer system.

9. The system of claim 7, wherein the processor is further operable, upon execution of the one or more instructions, to: for the first catalog image file:
receive, from a third computer system, a second selection of the first catalog image file;
receive, from the third computer system, a selection of one or more second parameters, wherein the selection of the second parameters is substantially identical to the selection of the first parameters;
receive, from the third computer system, second payment information for a purchase or a license of a second image file that is a version of the first catalog image file, wherein the second image file is substantially identical to the first image file;
after receiving the selection of the second parameters and the second payment information for the purchase or the license of the second image file, generate the second image file, wherein the processor operable, upon execution of the one or more instructions, to generate the second image file comprises the processor operable, upon execution of the one or more instructions, to process the first catalog image file based on the second parameters; and
transmit the second image file to the third computer system.

10. The system of claim 7, wherein the processor is further operable, upon execution of the one or more instructions, to: for the first catalog image file:
extract information from the first catalog image file;
generate data representing the extracted information for display on a web browser, the data representing the extracted information being in text form; and
provide the data representing the extracted information for display on the web browser.

11. The system of claim 7, wherein:
the first parameters further specify a resolution, a compression, and a color profile; and the first image file further has the resolution, the compression, and the color profile.

12. The system of claim 7, wherein the second format for the first catalog image file comprises a file format selected from a group consisting of:
FCP Pro Res 4444;
Pro Res 422;
JPEG;
PICVideo;
OpenAVS;
QuickTime H.264;
RealVideo; and
DPX.

* * * * *